April 11, 1950 G. W. BAUGHMAN 2,503,701
SIMPLEXED LINE CIRCUIT SYSTEM FOR
REMOTE CONTROL SYSTEMS
Original Filed Sept. 4, 1945
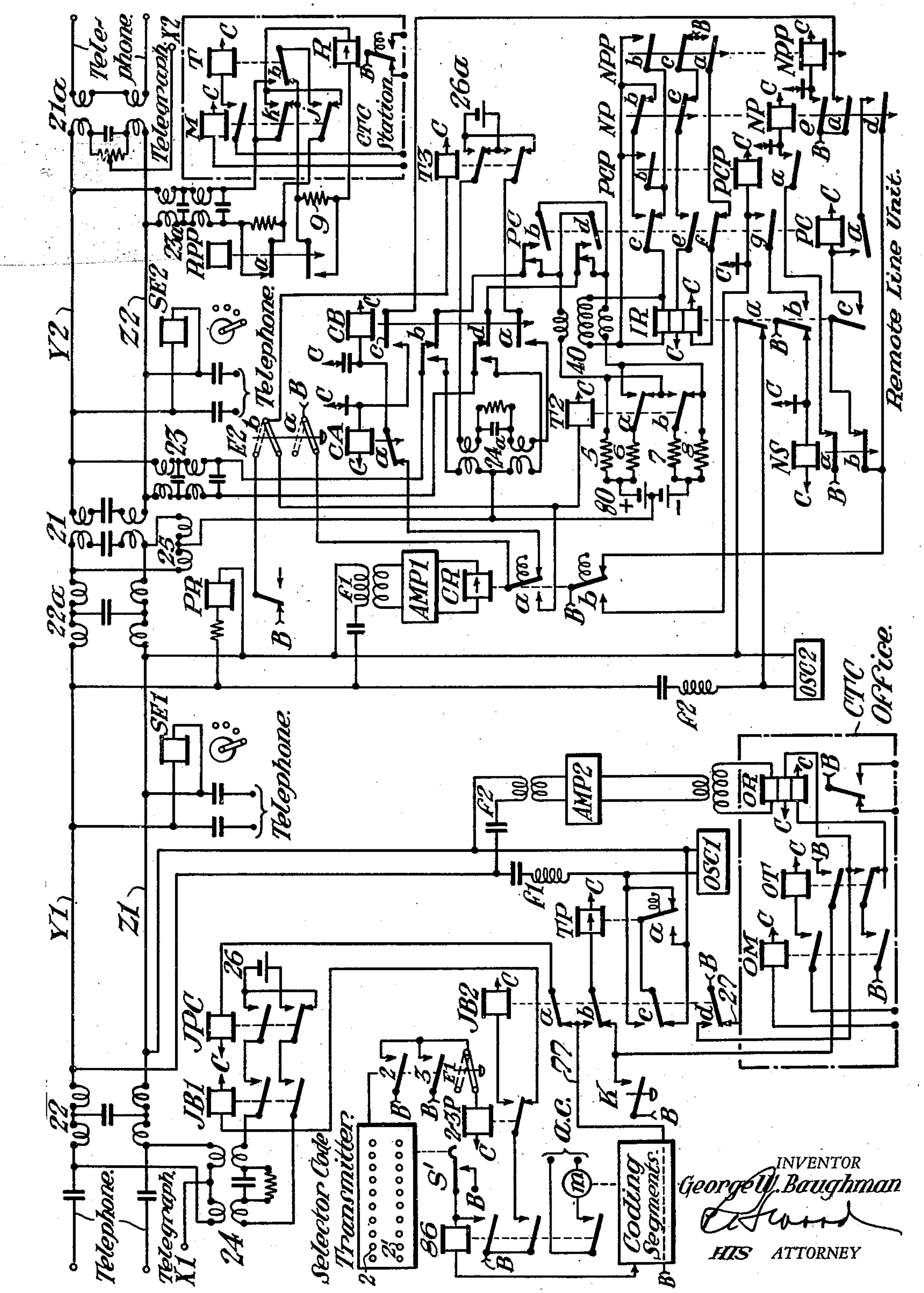
INVENTOR
George W. Baughman
HIS ATTORNEY Patented Apr. 11, 1950 2,503,701

UNITED STATES PATENT OFFICE 2,503,701

SIMPLEXED LINE CIRCUIT SYSTEM FOR REMOTE-CONTROL SYSTEMS

George W. Baughman, Swissvale, Pa., assignor to The Union Switch & Signal Company, Swissvale, Pa., a corporation of Pennsylvania Original application September 4, 1945, Serial No. 614,364. Divided and this application November 26, 1946, Serial No. 712,423

7 Claims. (Cl. 179—2)

This application is a division of my prior application, Serial No. 614,364, filed September 4, 1945, for Remote control systems, which issued as Patent No. 2,431,631, on November 25, 1947.

My invention relates to remote control systems, and more particularly to centralized traffic control systems for railroads, such for example, as that shown in Letters Patent of the United States No. 2,350,668, issued June 6, 1944, to George W. Baughman and Norman F. Agnew. The principal object of my invention is the provision of improved arrangements for superimposing such systems upon communication line circuits such as a train dispatcher's simplex telephone line equipped with selective calling apparatus, in which the line wires are energized in parallel by direct current, to provide a telegraph circuit with earth return.

As disclosed herein, the apparatus of my invention is arranged for use with the selective calling system shown and described in Letters Patent of the United States No. 1,976,548, issued October 9, 1934, to J. C. Field, which employs selectors controlled by impulses of alternately opposite polarity of a frequency of about 3.5 cycles per second.

In the centralized traffic control, or "C. T. C." system, a "time code" is used, comprising short and long impulses and intervals formed by interrupting or varying direct current normally supplied to the line circuit from a central battery, the short impulses being about 0.1 second, and the long impulses about 0.4 second in duration.

The selecting apparatus of each system is nonresponsive to codes transmitted by the other, but the codes of both systems are in a low frequency band which is separated from the voice frequencies by filters and their line signals are incompatible, and to enable both systems to use the same line wires it is the practice to allot the use of the line to only one system at a time, by disabling the C. T. C. system for the duration of a selector code whenever a telephone call is made.

In the C. T. C. system referred to, the length of the territory controllable over a single pair of line wires is extended by dividing the line into sections each of which provides a battery line circuit for a set of C. T. C. apparatus controlling the usual number of field stations. The code signals are repeated between the remote section and the office over the line wires of the intervening sections by carrier currents of frequencies above the voice frequency range, using two one way carrier channels for each line section.

In such installations, the selector system usually extends over the entire territory including several C. T. C. sections, and heretofore the selector codes have been repeated from section to section over the low frequency channel involving the disablement of the C. T. C. apparatus for all sections in order to effect the operation of a selector located in any section, with the result that the efficiency of the C. T. C. system is impaired to an undesirable extent.

In accordance with a feature of my invention, as claimed in my prior application above referred to, the selector system is sectionalized to correspond with the C. T. C. system, and the selector codes for each remote section are transmitted from the office over the carrier current channel used for the transmission of C. T. C. codes to that section. The character of each such code is identified by the relative length of the first impulse, and at the station where this carrier current code is received, a relay selectively responsive to the relative length of the first impulse selects either the C. T. C. transmitter or a selector transmitter for repeating the code into the low frequency channel for the section. The advantage of this arrangement is that the C. T. C. apparatus for only one section is disabled during the transmission of a selector code.

Another feature of my invention claimed herein, relates to improvements in the transmitting circuit by which the C. T. C. control codes are supplied to the line, one object of which is to provide a low resistance path by which the telegraph simplex channel is given access to the line wires through the line connections of the C. T. C. system in such a manner that its continuity is not interrupted during the delivery of a C. T. C. code to the line wires.

In respect to this and other features, my invention is an improvement upon that shown and described in Letters Patent of the United States No. 2,377,850, issued June 12, 1945, for Raymond C. Blakeslee, for Remote control systems. In accordance with this feature of my invention the telegraph channel obtains access to the line wires of the C. T. C. section through the C. T. C. line battery and through four resistors which are connected in parallel in the telegraph channel and are normally in series-parallel in the C. T. C. line circuit, serving in place of the usual current limiting resistors. The operation of the C. T. C. transmitter, in lieu of opening the connections to the line battery, interchanges the connections of two of the resistors to form a Wheatstone bridge, placing the two line wires at the same potential, or at a reversed potential, to quickly release the line relays at the C. T. C. stations, but without interference with the telegraph channel even in the case of faulty contact operation, thereby resulting in improved operation of both systems.

I shall now describe one form of apparatus embodying my invention and shall then point out the novel features thereof in claims.

Referring to the accompanying drawing, the reference characters Y1, Z1 and Y2, Z2 designate the line wires of a dispatcher's telephone line which extends from the dispatcher's office, shown at the left, through the territory controlled by the C. T. C. system. For simplicity, only two sections are shown, and the line is subdivided in accordance with the requirements of the C. T. C. system by interposing a transformer or high pass filter 21 in the telephone circuit arranged to pass currents in the voice frequency range only.

The control machine for the C. T. C. system is assumed to be located at the dispatcher's office, but since a showing of but one set of C. T. C. apparatus is deemed sufficient to illustrate my invention, I have shown herein only that which is associated with the C. T. C. line circuit for one remote section, comprising the line wires Y2—Z2. This circuit is normally supplied with current from a line battery 80 connected across the line wires Y2—Z2 through a remote line unit including a transmitter relay T2 and a receiving line relay IR, the current from battery 80 being effective to maintain energized a line relay R connected across the line wires at each of a plurality of similarly arranged C. T. C. stations, of which for simplicity but one is shown. Each line relay R controls coding apparatus selectively responsive to control codes supplied to line wires Y2—Z2 by the periodic operation of relay T2, and each C. T. C. station is provided with a transmitter relay T, which by connecting the line wires together periodically to vary the current supplied thereto by battery 80 is adapted to transmit indication codes to which the inductively coupled relay IR of the remote line unit is responsive. The line wires Y1—Z1 are arranged as required for the transmission of coded carrier currents between the office and the remote line unit location by the provision of suitable low pass filters 22 and 22*a* at the ends of the carrier current section, which block the passage of carrier currents but which have a cut-off above the voice frequency range.

The carrier current apparatus includes an electronic oscillator OSC1 at the office, adapted to generate current of a frequency *f*1, which has its output terminals connected to the line wires through resonant circuit elements but normally short circuited by a back contact *a* of a relay TP, which relay is a repeater of the transmitter relay OT of the C. T. C. coding unit at the office for the line section Y2—Z2. Relay TP responds to each operation of relay OT in transmitting a control code to remove the short circuit allowing the oscillator OSC1 to deliver a code impulse of frequency *f*1 to the line wires Y1—Z1, and at the same time relay OT operates the associated line relay OR of the office coding unit locally to register the transmitted code and to govern its transmission in the usual manner.

At the location of the remote line unit, the code of impulses of frequency *f*1 is received through selective circuit elements and an amplifier AMP1 by a code responsive receiving relay CR, which controls two transmitting relays T2 and T3. Relay T2 functions when a connector relay CB is energized, as shown, to repeat the code as battery current variations in the line Y2—Z2, to which the station line relays R respond.

Relay T3 is not part of the C. T. C. system, but functions as a pole changer to repeat selector codes into line Y2—Z2 when the connector relay CB is released, as hereinafter described. A second electronic oscillator OSC2 similar to OSC1, but at the remote line unit location is arranged to supply current of frequency *f*2 to the line wires Y1—Z1 in a similar manner, its output terminals being normally short circuited by contact *a* of relay IR. The periodic operation of relay IR in response to an indication code transmitted by relay T at any C. T. C. station in the section is repeated as impulses of frequency *f*2 over line Y1—Z1, and is received at the office through an amplifier AMP2 by which the line relay OR of the office coding unit is rendered responsive to the code.

It will be seen therefore that carrier currents are supplied to line Y1—Z1 only during code transmission. Line Y2—Z2, however, is normally energized by direct current and it is to be understood that the C. T. C. system is so arranged that a station is enabled to initiate code transmission only when the line circuit has been steadily energized for a time which exceeds the length of any of the elements of a code, suitable arrangements being provided for transmitting codes initiated at the same time, by different transmitters, one at a time in a given order of code superiority. Moreover, if the line circuit is interrupted during the transmission of an indication code, the interrupted code is retransmitted in its entirety when the line circuit is restored. Each control code begins with an impulse of about 0.4 second duration, and each indication code with one of about 0.12 second duration, and in the event a control code and an indication code are initiated at approximately the same time the former prevails, the station coding unit being conditioned by the long first impulse to receive the control code, its transmitter becoming disconnected and the code which it started to transmit is stored for transmission later.

Considering now the C. T. C. system circuits in detail, relays TP, CR and R are of the quick-acting biased polar type; relays OR and IR are of the stay-where-put stick polar type, and the remaining relays are neutral relays, certain of which are slow-to-release as indicated by a vertical arrow through their contacts as shown.

In the remote line unit, a slow release connector relay CB is normally energized over a circuit extending from one terminal B of a suitable local source of current at contact *a* of a manually operable switch E2, over back contacts *a* of relays CR and CA through relay CB to the other terminal C of the same source. Relay IR normally is in its left-hand position as shown, where its contact *b* completes an energizing circuit for a slow release relay NS which is thereby kept normally energized, the remaining relays of the remote line unit normally occupying their released positions, as shown.

The C. T. C. line circuit may be traced from the positive terminal of battery 80 over a current limiting resistor 5, and in parallel therewith, a resistor 6 and back contact *a* of relay T2, thence over one winding of an impulse transformer 40, back contact *b* of a pole changer relay PC, front contact *b* of relay CB and the coils of a low pass filter 23 to line Y2. At each station a circuit extends from line Y2 to line Z2 through the coils of a similar filter 23*a* over back contact *k* of relay M through a resistor 9 and the winding of relay R, back contact *j* of relay M, contact *a* of a disconnect relay RPP, and the coils of filter 23*a* to line Z2. The line circuit extends from wire Z2 to the negative terminal of battery 80 over a path similar to the one just traced, but including resistor 8 and in parallel therewith, resistor 7 and back contact *b* of relay T2.

The normally energized connector relay CB is arranged to have a release period of about 1.5 seconds, by the provision of timing means comprising a condenser of relatively large capacity connected across its terminals, as shown, and so remains in its energized position when relay CR is responding to a control code transmitted from the office, as well as when relay IR is responding to an indication code transmitted from a C. T. C. station, and thus maintains the connection of battery 80 to the line wires over its front contacts *b* and *d* during the normal operation of the C. T. C. system.

An indication code is initiated at a C. T. C. station by energizing a master relay M, which causes the associated transmitter relay T to be operated periodically in accordance with the code. When relay M picks up, its contacts *j* and *k* reverse the connections of the associated relay R to the line, thereby releasing relay R, since this relay is of the biased polar type responsive to current of one polarity only. Relay T picks up and closes its front contact *b*, connecting line wires Y2 and Z2 together through the coils of filter 23*a*, and short circuiting relay R, the circuit of which has a relatively high resistance, and the resulting increase in line current through transformer 40 induces an impulse in its secondary winding to operate relay IR to reverse.

Relay IR then energizes the pole changer relay PC over a circuit extending from terminal B at the right-hand contact *b* of relay CR, contact *b* of relay NS, contact *c* of relay IR through relay PC to terminal C. Relay PC energizes a slow release relay PCP, over the circuit from terminal B at contact *b* of relay IR, contact *g* of relay PC through relay PCP to terminal C. Relay PCP energizes a slow release relay NP over contacts *a* of relays NS and PCP, and relay NP energizes a slow release repeater relay NPP.

Contacts *b* and *d* of relay PC reverse the polarity of the current supplied by battery 80 to line wires Y2, Z2, thereby releasing relay R at each C. T. C. station except the one which initiated the code, thereby disabling the transmitters at such stations.

Relay IR is held reversed while the line polarity is being reversed over a local circuit including front contact *e* of relay PC and back contacts *c* of relays NP and NPP, and the transformer 40 is short circuited until relay NP picks up over front contact *c* of relay PC and back contact *b* of relay NP.

Relay IR, and relay R at the transmitting station, are now under the control of the transmitter relay T at that station. Relay R is energized over back contact *b* of relay T each time relay T releases during the delivery of the code, and the resulting decrease in line current operates relay IR to normal through transformer 40. Each time relay IR reverses, the opening of its contact *a* allows current of frequency *f*2 to be supplied to line Y1—Z1, operating relay OR to reverse, and each time relay IR closes its contact *a* relay OR is operated to normal, relay IR operating suitable decoding and code registering apparatus at the office in the usual manner.

Relays CB, NS, PC, PCP, NP and NPP remain picked up during the transmission of an indication code by relay T, relay PC being held energized over a stick circuit extending from terminal B at contact *b* of relay CR, contact *d* of relay NP, and contact *a* and the winding of relay PC to terminal C.

It is to be understood that the office coding unit controlled by relay OR functions in such a manner that the reception of a complete indication code is verified by the momentary energization of relay OT on the last step. This results in the energization of relay TP, to transmit an impulse of frequency *f*1 over line Y1—Z1 to briefly energize relay CR, thereby releasing relay PC and deenergizing relays PCP, NP and NPP controlled thereby and restoring the polarity of the current supplied to line Y2—Z2 to normal. While this occurs relay IR is held in its normal position over a local circuit including back contact *f* of relay PC and front contact *a* of relay NPP, and transformer 40 is short circuited over back contact *c* of relay PC, and front contacts *b* of relays PCP and NPP. Relay M at the transmitting station is released at substantially the same time, and it follows that, upon the release of relay PC, relays R at all stations become steadily energized and the office line relay OR remains in its normal position, restoring the system to its normal condition.

A control code is initiated by energizing the master relay OM at the office, causing relay OT and its repeater relay TP to be operated periodically to deliver a code of impulses of frequency *f*1 to line Y1—Z1, to which relay CR responds.

In response to the first impulse of a control code, relay CR closes its left-hand contact *b*, energizing relay PCP, which energizes relays NP and NPP, relay PC remaining released.

The transmitter relay T2 is energized over the left-hand contact *a* of relay CR, to repeat the code into line Y2—Z2. It will be seen that when relay T2 is energized, the connections of resistors 6 and 7 to the line wires are interchanged and that resistors 6 and 8 are connected in series across the two end terminals of battery 80 over front contact *a* of relay T2, and resistors 5 and 7 are connected in series across these terminals over front contact *b* of relay T2. Assuming first that all four resistors are of equal value when relay T2 is picked up, wires Y2 and Z2 are connected to battery 80 at points of the same potential, reducing the line current to zero and releasing the line relays R. The resistors 5—8 also provide a discharge path for energy stored in the line, due to line capacity, or to the inductance of the relays R, which path has two branches, one extending from wire Y2 to wire Z2 over resistors 5 and 6 in series, and the other over resistors 7 and 8 in series.

Considering this circuit from another point of view, it will be seen that the line current includes a steady component of normal polarity supplied over the resistors 5 and 8, and that the contacts of relay T2 serve as a pole changer to superimpose thereon a component of reversible polarity, over resistors 6 and 7, the total line current being the sum or difference of the two components, depending upon the position of relay T2.

In general, it is desirable to arrange the line circuit so that the line relays will release quickly when the transmitter relay picks up and to pick up quickly when the transmitter relay releases, to avoid code distortion. For certain types of line circuits the transmission characteristics may be improved by making resistors 5 and 8 of higher value than resistors 6 and 7, in which case when relay T2 picks up the component of line current of reverse polarity may be made sufficient to overcome not only the steady component referred to but also the transient discharge current which otherwise would continue to flow through the line relay windings due to their inductance or due to the capacity of the line to render them slow to release.

Considering now the telegraph circuit which as shown extends between terminals X1 and X2 over the usual simplex connections and the line wires of the dispatcher's telephone circuit in parallel, and for which a by-pass is required around the interposed filter 21. The telegraph circuit may be traced from terminal X1 through the primary coils of a transformer 24, filter 22, line wires Y1 and Z1, filter 22*a* and thence through a simplex coil 25 and through battery 80 from its middle terminal to its two end terminals, and thence over the four resistors 5 to 8 in parallel and differentially through the coils of transformer 40, back contacts *b* and *d* of relay PC, front contacts *b* and *d* of relay CB, and the coils of filter 23 to line wires Y2 and Z2, and through transformer 21*a* to terminal X2.

It will be seen that the resistance presented by resistors 5, 6, 7 and 8 to the telegraph circuit is one-fourth that which they present to the C. T. C. line circuit and has the same value irrespective of whether relay T2 is picked up or released, or is in its mid stroke position in which its front and back contacts are adjusted to overlap. In the event of faulty adjustment or of a failure of the contacts of relay T2, resistors 5 and 8 in parallel maintain the continuity of the telegraph circuit with but a slight increase in its overall resistance not detrimental to its operation. Furthermore, the increase in the resistance of the telegraph circuit due to the series connection through battery 80 is much less than if the alternative bridged form of simplex connection, as illustrated by transformer 21*a*, were used with transformer 21, since the latter if applied to transformer 21 would require resistors of relatively high value.

It will be seen therefore that the bridge form of transmitting circuit as illustrated by the resistors 5 to 8, improves the operation of both the telegraph and C. T. C. systems over the arrangements heretofore available.

Returning now to a consideration of the control code being transmitted by relay T2, it will be seen that the line relays R will respond thereto in the same manner as when the line circuit is periodically interrupted as in the prior systems. Relay PCP is energized periodically by relay CR, and relay NPP controlled thereby remains picked up until the code is completed. Transformer 40 is short circuited over back contact *c* of relay PC and front contacts *b* of relays PCP and NPP, and the impedance it presents to the line circuit is thereby reduced. Relay IR is held in its normal position throughout the code by the energization of a local winding over the circuit including front contact *a* of relay NPP and back contact *f* of relay PC.

The dispatcher's telephone system includes a telephone at the office and at each of a number of way stations at each of which a selector is provided for selective ringing, which may be of the type shown in Letters Patent of the United States No. 1,343,256, issued June 15, 1920, to J. C. Field. For simplicity but one selector is shown in each line section, identified by the references SE1 and SE2, respectively, these being selectively responsive to codes delivered to the line wires by a transmitter of the type shown in Patent No. 1,976,548, hereinbefore referred to. Each selector code comprises a series of seventeen impulses arranged in three groups in accordance with the table of code settings contained in this patent, and to effect their transmission, the selector code transmitter is provided with two rows of numbered push buttons. It is to be understood that the operation of any button in the upper row selects for transmission the first digit, and the operation of one in the lower row, the remaining digits of a code, by making the proper connections to a series of coding segments. The operation of the keys 2, 2′, for example, selects the code 2—13—2. The operation of any key in the lower row momentarily closes a contact S′ to energize a locking relay 86, thereby energizing a constant speed motor *m* to drive a wiper arm or brush connected to one terminal B of the local source of current over each of the coding segments in turn to generate the selected code by effecting the periodic energization of a circuit including wire 77, relay 86 releasing to stop the motor after one cycle of operation.

If the selector code is one for operating a selector SE1, connector relay JB1 is energized by relay 86 for the duration of the code to connect a battery 26 over the contacts of a pole changer relay JPC to the primary of an impulse transformer 24 to supply a code of impulses of alternately opposite polarity to the line in accordance with the periodic energization of relay JPC over wire 77, to which code one of the selectors SE1 is selectively responsive.

To control the selectors SE2, the transmitter is modified in accordance with my invention by assigning codes having certain first digits, say 2 or 3, to the selectors in line Y2—Z2, and different first digits, say 4 or 5, to those in line Y1—Z1, and by the provision of a relay 2—3P which becomes energized when any key in the upper row which controls a selector in line Y2—Z2 is operated. Thus if keys 2 and 2′ for the code 2—13—2 are operated, relay 2—3P is operated by key 2, and relay 86 by key 2′ to energize a connector relay JB2 in place of relay JB1. Contact *b* of relay JB2 then disconnects relay TP from the C. T. C. coding unit and connects it to wire 77, relay JPC being disconnected by the opening of back contact *a* of relay JB2. Contact *c* of relay JB2 shifts the connections of contact *a* of relay TP so as to reverse the phase of the carrier current code supplied thereby, and since relay TP is released, the immediate effect of the shift is to remove the short circuit from the output terminals of oscillator OSC1, causing current of frequency *f1* to be supplied to the line to energize relay CR. At the same time, front contact *d* of relay JB2 completes a local circuit to energize relay OR in the reverse direction, and the opening of back contact *d* of relay JB2 disconnects terminal B from a wire 27 which it is to be understood disables the C. T. C. office coding unit and interrupts the transmission or reception of a code thereby if one is in progress at the time.

The selector code transmitter is so arranged that following the energization of relay 86, a time interval of about two seconds elapses before motor *m* connects terminal B to the segment for the first digit of the selector code to effect the energization of relay TP over wire 77. As the operation of motor *m* continues, relay TP is energized periodically to interrupt the carrier current in accordance with the code setting. Each selector code supplied to line Y1—Z1 thus begins with a preliminary impulse of about two seconds duration terminated when relay TP picks up, and is thus distinguishable by code character from a C. T. C. code, in which the duration of the first impulse is of the order of 0.4 second or of 0.12 second as already explained.

The energization of relay CR by the preliminary impulse of the selector code as above described causes relay T2 and the pole changer relay T3 connected in parallel therewith to become energized for a corresponding period of two seconds. Relay T2 releases the C. T. C. station line relays R, and the timing relays which they control, thereby disabling the C. T. C. station transmitters and interrupting any code then in progress. Relay CR also energizes relays PCP, NP and NPP and opens the energizing circuit for relay CB.

Relay CB releases after about 1.5 seconds, completing a circuit at its back contact *c* extending to terminal B at contact *a* of relay NP, to pick up a slow relase relay CA, which relay opens its contact *a* in the circuit for relay CB so as to hold relay CB released during the reception of the selector code by relay CR. When relay CB releases, its back contacts *b* and *d* disconnect line wires Y2—Z2 from battery 80 and connect the secondary of an impulse transformer 24*a* thereto, and its back contact *a* connects a battery 26*a* over the pole changer contacts of relay T3 to the primary of transformer 24*a*. Relay T3 repeats the selector code received by relay CR, and causes a corresponding code of impulses of alternately opposite polarity to be supplied to the line wires Y2—Z2, to which code one of the selectors SE2 is selectively responsive.

While relay CB is in its released position, a by-pass for the telegraph circuit around transformer 21 is provided which extends from line Y1—Z1 through coil 25 to the primary of transformer 24*a* and thence over back contacts *b* and *d* of relay CB to line Y2—Z2. These contacts are of the transfer type whereby the continuity of this circuit is maintained during their operation from one position to another.

The last element of the selector code constitutes an extended ringing period during which relay TP remains released to supply carrier current to the line. The ringing period is terminated by the release of relays 86, JB2, CR, T2 and T3, whereupon relays PCP, NP and CA release successively, relay CB then becoming energized to restore the C. T. C. system to its normal condition. Any C. T. C. code which was interrupted due to the transmission of the selector code will then be retransmitted in its entirety, suitable arrangements for effecting this result being described in Letters Patent of the United States No. 2,332,191, issued October 19, 1943, to George W. Baughman and Norman F. Agnew, and in a pending application for Letters Patent of the United States, Serial No. 496,907, filed July 31, 1943, by Arthur P. Jackel, for Remote control systems, which issued as Patent No. 2,411,375, on November 19, 1946.

In practice, the C. T. C. stations of the system are generally equipped with disconnecting apparatus such as is shown in my Letters Patent of the United States No. 2,376,569, issued May 22, 1945, for Remote control systems, and illustrated by the relay RPP shown herein. It is to be understood that relay RPP releases in response to a steady deenergization of the line Y2—Z2 for an interval of not less than six seconds, and may be released by energizing relay TP by the operation of a key K at the office to apply steady current of frequency *f1* to line Y1—Z1. The purpose of relays RPP is to disable the station transmitters in case of a fault in such a way that they may be restored to operation one by one by the transmission of control codes. Since the release period of relay RPP exceeds that of relay CB by a considerable margin, relay RPP is not released during the preliminary impulse of a selector code, while during the delivery of the selector code to line Y2—Z2, each line relay R is operated momentarily by those alternate impulses of the selector code which are of the proper polarity, so that relay RPP is maintained picked up. On the other hand, although when key K is held closed, relay CB releases, this does not interfere with its control of relay RPP. This feature of the system therefore functions in the normal manner when used with the apparatus of the present invention.

It is also of advantage to provide emergency means for calling stations in line Y2—Z2 in order to control traffic movements if for any reason the C. T. C. system is out of service. This is accomplished as shown herein by the provision of the emergency keys E1 and E2, together with a stick polar relay PR connected across line Y1—Z1 as shown. When switch E1 is placed in its upper position, relay 2—3P is non-responsive to the operation of push button 2 or 3, and then all of the selector codes are supplied to line Y1—Z1. When switch E2 is placed in its upper position, relay T3 is connected to the normal contact of relay PR and terminal B is disconnected from contact *a* of relay CR, causing relay CB to release and allowing the selector codes received by relay PR from line Y1—Z1 to be repeated by relay T3 into the line section Y2—Z2, in which case any code having its first digit 2 or 3 will selectively operate the corresponding selector SE2 located in that section.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination with a pair of line wires arranged to form two sections in each of which the line wires are connected in parallel in a telegraph circuit or the like and in series in a telephone circuit; an electrical filter connecting said sections to extend the telephone circuit from one section to a second section, a code system having a transmitter relay and a normally energized line circuit controlled thereby comprising the line wires of said second section in series and the winding of a line relay connected across said line wires, means for energizing said line circuit comprising a source of direct current having its end terminals connected to the two line wires through two equal resistors, means for extending said telegraph circuit from one section to the other comprising a balanced connection from the middle terminal of said source to the middle terminal of an impedance having two end terminals connected to the line wires of said one section, and means for varying the current supplied by said source to said line circuit to control said line relay comprising two additional resistors of equal value connected between the end terminals of said source and the line wires over pole changer contacts of said transmitter relay.

2. In combination with a pair of line wires which are connected in parallel in a simplex telegraph circuit or the like and in series in a line circuit for a remote control system, a source of direct current for energizing said line circuit having end terminals connected to the line wires through two resistors of substantially equal value and having a middle terminal to which said telegraph circuit is connected to obtain access to the line wires, a line relay at a station of said remote control system connected across the line wires and normally energized by current from said source, and means for supplying codes of impulses to said line circuit to control said line relay comprising pole changer contacts of a transmitter relay arranged to reversibly connect the end terminals of said source to the line wires through two other resistors of substantially equal value.

3. In combination with a pair of line wires which are connected in parallel in a simplex telegraph circuit or the like and in series in a line circuit for a remote control system, a source of direct current for supplying current to said line circuit, a transmitter relay, four resistors interposed in said line circuit between said source and said line wires, said source having one of its two end terminals normally connected to one of the line wires through a pair of said resistors in parallel and having its other end terminal normally connected to the other line wire through another pair of said resistors in parallel, said source also having a middle terminal over which said telegraph circuit is connected to obtain access to the two line wires in parallel over all four of said resistors in parallel, a line relay at a station of said remote control system connected across the line wires and normally energized by current supplied to said line circuit from said source, and means for varying the current supplied to said line circuit from said source to control said line relay comprising pole changer contacts of said transmitter relay which when operated disconnect one resistor of each pair from the line wire to which it is normally connected and connect such resistor to the other line wire.

4. In a remote control system, a line circuit including two line wires in series, four resistors and a source of direct current, said source having one end terminal normally connected to one of the line wires through two of said resistors in parallel, and its other end terminal normally connected to the other line wire through the other two resistors in parallel, and means comprising two transmitting contacts for interchanging the connections to the line wires of two of the resistors so that the current supplied by said source to the line wires through said two resistors either adds to or opposes that supplied through the other two depending upon the position of said contacts.

5. In a remote control system, a line circuit including a pair of line wires and a line relay of the biased polar type connected across the line wires at each of one or more stations, a source of direct current, four resistors for connecting said source to said line wires, one end terminal of said source being normally connected to one of the line wires through two of said resistors in parallel, the other end terminal of said source being normally connected to the other line wire through the other two resistors in parallel, and means comprising two transmitting contacts for interchanging the connections to the line wires of two of the resistors so that in one position of said contacts the current supplied through said two resistors adds to that supplied through the other two to effect the energization of said line relays while in the other position of said contacts such currents are in opposition to effect the release or reversal of said line relays.

6. In a remote control system, a line circuit comprising a polarized line relay in series with a pair of line wires and a source of direct current said source being connected to the line wires over four resistors, one end terminal of said source being normally connected to one of the line wires through two of said resistors in parallel, the other end terminal of said source being normally connected to the other line wire through the other two resistors in parallel, and means comprising two transmitting contacts for interchanging the connections to the line wires of two of the resistors so that in one position of said contacts the current through said two resistors adds to that supplied through the other two to supply current of a given relative polarity to the line relay, while in the other position of said contacts the current through said two resistors opposes that through the other two to supply current of the opposite polarity to the line relay.

7. In a line circuit system comprising a pair of line wires which are connected in parallel in a simplex telegraph circuit or the like and in series in a line circuit for a remote control system, said remote control system having a line relay connected across the line wires, means for supplying code impulses of current to said line circuit to operate said line relay without interference with said telegraph circuit comprising a transmitter relay having two normally closed contacts and two normally open contacts, a source of current having two end terminals and also having a middle terminal to which said telegraph circuit is connected to obtain access to both line wires, a first resistor connected between one end terminal of said source and one line wire, a second resistor of substantially the same value as the first connected between the other end terminal of said source and the other line wire, a third resistor connected to said one end terminal of the source and alternatively to said one line wire over a normally closed contact or to the other line wire over a normally open contact of said transmitter relay, and a fourth resistor of substantially the same value as the third connected to the other end terminal of the source and alternatively to said other line wire over a normally closed contact or to said one line wire over a normally open contact of said transmitter relay.

GEORGE W. BAUGHMAN.

REFERENCES CITED

The following references are of record in the file of this patent:

UNITED STATES PATENTS

| Number | Name | Date |
|---|---|---|
| 1,719,485 | Pease | July 2, 1929 |
| 2,181,312 | Arzmaier | Nov. 28, 1939 |